(12) United States Patent
Tucker et al.

(10) Patent No.: US 11,561,980 B2
(45) Date of Patent: Jan. 24, 2023

(54) DATABASE SEARCH METHOD AND APPARATUS

(71) Applicant: Pixit Media Limited, Leatherhead (GB)

(72) Inventors: Jeremy Tucker, Leatherhead (GB); John Leedham, Leatherhead (GB); Christopher Oates, Leatherhead (GB); Christopher Jones, Leatherhead (GB)

(73) Assignee: PIXIT MEDIA LIMITED, Surrey (GB)

( * ) Notice: Subject to any disclaimer, the term of this patent is extended or adjusted under 35 U.S.C. 154(b) by 110 days.

(21) Appl. No.: 16/771,602

(22) PCT Filed: Nov. 30, 2018

(86) PCT No.: PCT/GB2018/053475
§ 371 (c)(1),
(2) Date: Jun. 10, 2020

(87) PCT Pub. No.: WO2019/116002
PCT Pub. Date: Jun. 20, 2019

(65) Prior Publication Data
US 2020/0301927 A1 Sep. 24, 2020

(30) Foreign Application Priority Data
Dec. 14, 2017 (GB) ..................... 1720888

(51) Int. Cl.
*G06F 16/245* (2019.01)
*G06F 16/903* (2019.01)
(Continued)

(52) U.S. Cl.
CPC .... *G06F 16/24554* (2019.01); *G06F 16/2458* (2019.01); *G06F 16/9035* (2019.01)

(58) Field of Classification Search
None
See application file for complete search history.

(56) References Cited

U.S. PATENT DOCUMENTS

2006/0100974 A1* 5/2006 Dieberger ............. G06F 16/284
2011/0040810 A1* 2/2011 Kaplan .................. G06F 16/11
707/822

(Continued)

FOREIGN PATENT DOCUMENTS

EP 1 585 036 A2 10/2005
EP 3 038 002 A1 6/2016

OTHER PUBLICATIONS

International Search Report and Written Opinion dated Feb. 4, 2019, from application No. PCT/GB2018/053475.
(Continued)

*Primary Examiner* — Son T Hoang
(74) *Attorney, Agent, or Firm* — Foley & Lardner LLP (57) ABSTRACT

A search apparatus (1) coupled to a database, the apparatus (1) comprising: a processor configured to execute instructions; a memory storing instructions which, when executed by the processor, cause the processor to: search the database for items containing a search term, wherein items containing the search term are matched items; identify fields corresponding to attributes of the matched items; define a range of values for each field; divide the range of values for each field into a plurality of ranged field buckets; distribute the matched items between the ranged field buckets based on attributes of the matched items that are within the range of values for each ranged field bucket; calculate an effectiveness value for each field based on the number of matched items in each of the ranged field buckets; select one or more top fields, each top field having an effectiveness value that is greater than a predetermined effectiveness value; and provide an effectiveness indicator output which is indicative (Continued)

of the effectiveness of each top field such that a user can use the effectiveness indicator output to select a top field for use as a filter in a further search.

20 Claims, 6 Drawing Sheets

(51) Int. Cl.
*G06F 16/2455* (2019.01)
*G06F 16/2458* (2019.01)
*G06F 16/9035* (2019.01)

(56) References Cited

U.S. PATENT DOCUMENTS

| | | |
|---|---|---|
| 2014/0282031 A1* | 9/2014 | Hinterbichler .......... G06F 16/34 |
| 2015/0019537 A1* | 1/2015 | Neels .................... G06F 16/338 |
| | | 707/722 |
| 2015/0154269 A1* | 6/2015 | Miller ................... G06F 16/904 |
| 2016/0180557 A1* | 6/2016 | Yousaf ................. G06F 16/334 |
| 2017/0192974 A1 | 7/2017 | Kumar et al. |
| 2017/0331776 A1* | 11/2017 | Bastide ................ G06F 16/245 |

OTHER PUBLICATIONS

Krabb, et al., "Patent Searching Using Free Search Tools", Intellectual Property Owners Association, Mar. 31, 2017, 24 pages.

\* cited by examiner

Figure 5 pixstorsearch                                                      Enter a search term *  🔍
                                                                       cats
                                                                       ⊞ ▦             ✕

Filters
Click to select / deselect

> ☐ Core - Accesstime                    ∨ ☐ Core - Size (78)              > ☐ Gpfs - Poolname
> ☐ Core - Blocksize                       ☐ Core - Size - 100000 - *(16)
∨ ☐ Core - Changetime (78)                 ☐ Core - Size - 1300 - 42100 (14)    ∨ ☐ Image - Height (75)
  ☐ Core - Changetime - 2017-06-19T00:00:00.000Z - *(5)   ☐ Core - Size - 42100 - 54600 (16)   ☐ Image - Height - 300 - 400 (13)
  ☐ Core - Changetime - 2017-07-03T00:00:00.000Z - *(73)  ☐ Core - Size - 54600 - 74000 (16)   ☐ Image - Height - 400 - 500 (23)
                                           ☐ Core - Size - 74000 - 100000 (16)  ☐ Image - Height - 500 - 600 (8)
> ☐ Core - Directory                                                            ☐ Image - Height - 600 - 700 (13)
> ☐ Core - Extension                     > ☐ Core - User name                   ☐ Image - Height - 700 - * (18)
> ☐ Core - Group name                    > ☐ Gpfs - Creationtime
> ☐ Core - Mimetype                      > ☐ Gpfs - Filesetname             ∨ ☐ Image - Megapixels (75)
> ☐ Core - Modificationtime              ∨ ☐ Gpfs - Kballocated (78)           ☐ Image - Megapixels - 0.1 - 0.2 (13)
> ☐ Core - Nlink                           ☐ Gpfs - Kballocated - 100 - 200 (75) ☐ Image - Megapixels - 0.2 - 0.3 (32)
                                           ☐ Gpfs - Kballocated - 200 - *(3)    ☐ Image - Megapixels - 0.3 - 0.4 (13)
                                                                                ☐ Image - Megapixels - 0.4 - 0.5 (6)
                                         > ☐ Gpfs - Miscattributes               ☐ Image - Megapixels - 0.5 - * (11)
                                         > ☐ Gpfs - Modificationsnapid
                                                                         > ☐ Image - Resolution
                                                                         > ☐ Image - Width

Figure 8

DATABASE SEARCH METHOD AND APPARATUS

CROSS-REFERENCE TO RELATED APPLICATIONS

This application is a national stage application under 35 U.S.C. § 371 of International Application No. PCT/GB2018/053475, filed Nov. 30, 2018, which claims priority to and benefit of GB Application No. 1720888.5, filed Dec. 14, 2017, the contents of each of which are incorporated herein by reference in their entireties The present invention relates to a database search method and apparatus.

A conventional search engine is typically configured to search a database for items corresponding to one or more search terms entered by a user and to return pages of search results to the user in order of relevance. The user must then read through the search results to try to identify the required data.

The relevance order of the search results is typically dependent upon the search terms entered by the user. If a user enters search terms that are too generalised then there is a high probability that the search results will be presented by the search engine such that any relevant search results are presented far down the list of search results and potentially on a second or a later page of search results. This can mean that the user never identifies the relevant search results because a user will typically not devote time to reading through a long list of search results which may be presented across several different pages of search results.

In order to improve the relevance order of search results, it is known to refine the search algorithm of a search engine to provide search results that are presented to a user with the relevant search results appearing towards the top of the list of search results. The search algorithm is typically refined using the search history of a user and/or other factors.

The problem with a conventional search engine is that it is reliant on a user entering search terms that are not overly generalised. It is therefore often a manner of trial and error for a user to enter different search terms into a search engine and to review numerous search results until the user identifies items of relevance.

A further problem is that conventional search techniques can be slow when there are a large number of items stored in a database. For instance, for an audio/visual application, a database might typically comprise 700,000,000 items which are each associated with a plurality of metadata fields. A conventional search engine will typically perform a recursive search of all metadata to identify items that match a search input. A conventional search technique of this type takes a long time (typically over 1 hour) and requires a large amount of processing power.

The present invention seeks to provide an improved method and apparatus for searching a database.

According to one aspect of the present invention, there is provided a search apparatus coupled to a database, the apparatus comprising: a processor configured to execute instructions; a memory storing instructions which, when executed by the processor, cause the processor to: search the database for items containing a search term, wherein items containing the search term are matched items; identify fields corresponding to attributes of the matched items; define a range of values for each field; divide the range of values for each field into a plurality of ranged field buckets; distribute the matched items between the ranged field buckets based on attributes of the matched items that are within the range of values for each ranged field bucket; calculate an effectiveness value for each field based on the number of matched items in each of the ranged field buckets; select one or more top fields, each top field having an effectiveness value that is greater than a predetermined effectiveness value; and provide an effectiveness indicator output which is indicative of the effectiveness of each top field such that a user can use the effectiveness indicator output to select a top field for use as a filter in a further search.

Preferably, the memory further stores instructions which, when executed by the processor, cause the processor to: generate a further search instruction comprising the search term and a filter, wherein the filter corresponds to one or more of the top fields.

Conveniently, the memory further stores instructions which, when executed by the processor, cause the processor to: provide a further search instruction output to a user which is indicative of the further search instruction; and receive an input from the user which selects the further search instruction for use in a further search.

Advantageously, the memory further stores instructions which, when executed by the processor, cause the processor to: determine an effectiveness order for each top field based on its effectiveness value, wherein the effectiveness indicator output is indicative of the effectiveness order.

Preferably, the memory further stores instructions which, when executed by the processor, cause the processor to: search the database for items containing the search term and an attribute that matches a filter.

Conveniently, the memory further stores instructions which, when executed by the processor, cause the processor to: output a graphical representation for each of the top fields which is indicative of the effectiveness value of the field.

Advantageously, the memory further stores instructions which, when executed by the processor, cause the processor to: select the colour of each coloured area in response to the effectiveness value of the field.

Preferably, the memory further stores instructions which, when executed by the processor, cause the processor to: select the colour of each coloured area by modifying the saturation level of the colour of each coloured area in response to the effectiveness value of the field.

Conveniently, the memory further stores instructions which, when executed by the processor, cause the processor to: modify a transparency level of at least part of the graphical representation in response to the effectiveness value of the field.

Advantageously, the memory further stores instructions which, when executed by the processor, cause the processor to: store data corresponding to the matched field items in the ranged field buckets of at least some of the top fields.

Preferably, the memory further stores instructions which, when executed by the processor, cause the processor to: calculate a further effectiveness value corresponding to an extended attribute for a field based on the number of matched items in each ranged field bucket that comprise the extended attribute.

Conveniently, the apparatus comprises a plurality of shards which each comprise a memory which stores the same instructions as the memory of any one of the preceding claims.

Advantageously, at least one of the shards is implemented in a control server which is coupled to a filesystem.

Preferably, the control server is a dedicated server which is coupled to the filesystem.

According to another aspect of the present invention, there is provided a method of searching a database, wherein the method comprises: searching a database for items containing a search term, wherein items containing the search term are matched items; identifying fields corresponding to attributes of the matched items; defining a range of values for each field; dividing the range of values for each field into a plurality of ranged field buckets; distributing the matched items between the ranged field buckets based on attributes of the matched items that are within the range of values for each ranged field bucket; calculating an effectiveness value for each field based on the number of matched items in each of the ranged field buckets; selecting one or more top fields, each top field having an effectiveness value that is greater than a predetermined effectiveness value; and providing an effectiveness indicator output which is indicative of the effectiveness of each top field such that a user can use the effectiveness indicator output to select a top field for use as a filter in a further search.

Preferably, the method further comprises: generating a further search instruction comprising the search term and a filter, wherein the filter corresponds to one or more of the top fields.

Conveniently, the method further comprises: providing a further search instruction output to a user which is indicative of the further search instruction; and receiving an input from the user which selects the further search instruction for use in a further search.

Advantageously, the method further comprises: determining an effectiveness order for each top field based on its effectiveness value, wherein the effectiveness indicator output is indicative of the effectiveness order.

Preferably, the method further comprises: searching the database for items containing the search term and an attribute that matches a filter.

Conveniently, providing the effectiveness indicator output comprises: outputting a graphical representation for each of the top fields which is indicative of the effectiveness value of the field.

Advantageously, the graphical representation is a coloured area and the method comprises: selecting the colour of each coloured area in response to the effectiveness value of the field.

Preferably, the method comprises: selecting the colour of each coloured area by modifying the saturation level of the colour of each coloured area in response to the effectiveness value of the field.

Conveniently, the method comprises: modifying a transparency level of at least part of the graphical representation in response to the effectiveness value of the field.

Advantageously, the method further comprises: storing data corresponding to the matched field items in the ranged field buckets of at least some of the top fields.

Preferably, the method further comprises: calculating a further effectiveness value corresponding to an extended attribute for a field based on the number of matched items in each ranged field bucket that comprise the extended attribute.

Conveniently, the method is performed using a plurality of search modules which are each implemented in a shard in a sharded database.

Advantageously, at least one of the shards is implemented in a control server.

Preferably, the control server is a dedicated server.

According to a further aspect of the present invention, there is provided a computer readable medium storing instructions which, when executed by a computing device or system, cause the computing device or system to perform the method of any one of claims 15 to 28 as defined hereinafter.

According to another aspect of the present invention, there is provided a computer program product comprising instructions which, when executed by a computing device or system, cause the computing device or system to perform the method of any one of claims 15 to 28 as defined hereinafter.

So that the present invention may be more readily understood, embodiments of the present invention will now be described, by way of example, with reference to the accompanying drawings, in which.

Figure 1:
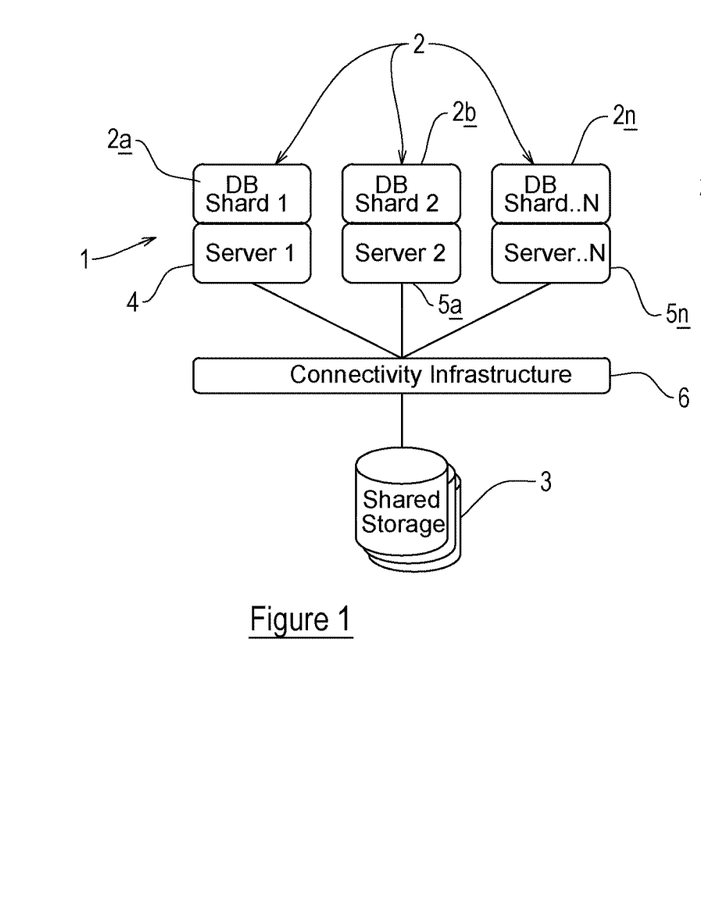
FIG. 1 is a schematic diagram of a search apparatus of some embodiments.

Referring initially to FIG. 1 of the accompanying drawings, a search apparatus 1 of some embodiments comprises a search module 2 which comprises a plurality of search module entities. In this embodiment, the search module 2 comprises a database and the database is sharded with across all search module entities. The search module 2 is implemented in a data processing apparatus, such as a first server 4. In some embodiments, the search module 2 and the database shards are sharded across a plurality of servers 4, 5a-n such that each search module is implemented as a shard 2a-n on a respective server 4, 5a-n. The embodiment shown in FIG. 1 comprises three servers 4, 5a-n but it is to be appreciated that other embodiments comprise a greater or fewer number of servers.

The sharding of the search module optimises the search performance by dividing and distributing search processes between the plurality of servers. Furthermore, sharding the search module between a plurality of servers enables the search facility to remain operational when one of the servers is taken offline since the other shards keep the search facility operational.

Each of the servers 4, 5a-n is coupled for communication with a filesystem 3 by a connectivity infrastructure 6. The connectivity infrastructure 6 can comprise any data communication infrastructure, such as a computer network and/or the Internet.

Figure 2:
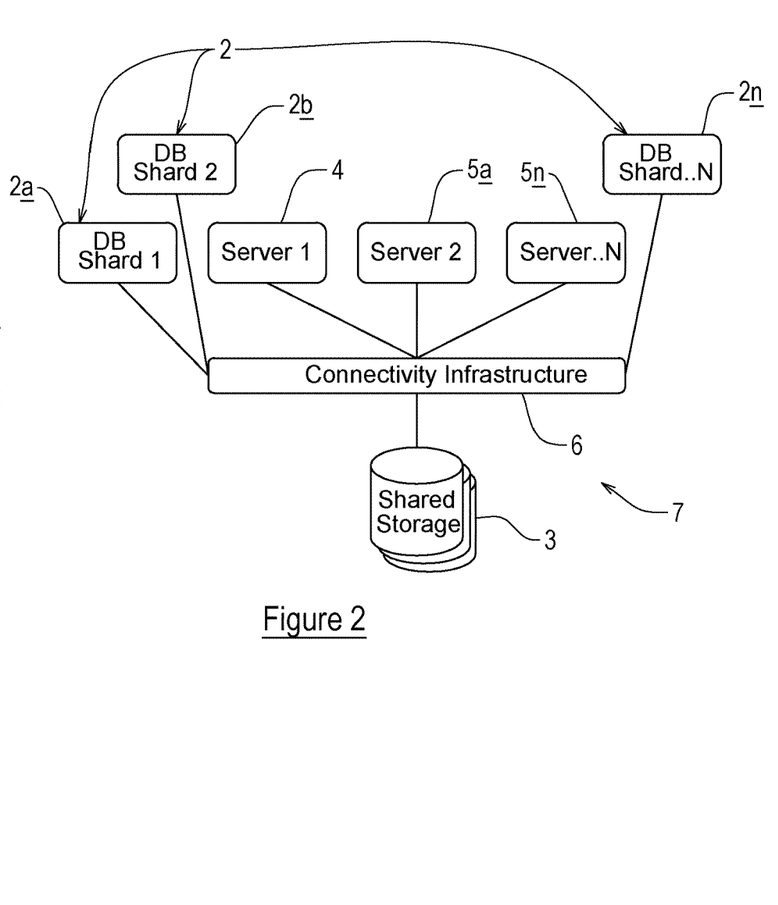
FIG. 2 is a schematic diagram of a search apparatus of further embodiments.

Referring now to FIG. 2 of the accompanying drawings, a search apparatus 7 of some embodiments comprises many of the same components as the search apparatus 1 described above. However, the shards 2a-n of the search module 2 are implemented in dedicated hardware instead of being implemented in the servers 4, 5a-n. In this embodiment, the shards 2a-n of the search module 2 are coupled for communication with the servers 4, 5a-n and the filesystem 3 via the connectivity infrastructure 6.

It is to be appreciated that the configurations shown in FIGS. 1 and 2 are examples of search apparatus architectures of some embodiments. In other embodiments, the search module 2 is not sharded and in further embodiments the search module 2 is sharded across a greater number of shards. In some embodiments, the search module and/or shards are implemented in dedicated hardware and/or implemented in servers that provide other functionality within the apparatus.

In some embodiments, at least one of the servers 4, 5a-n are General Parallel File System (GPFS) servers. However, in other embodiments, the servers 4, 5a-n are servers which operate using a different filesystem or another data storage and retrieval mechanism.

In some embodiments, the search module 2 includes various software modules, which can be distributed between an application layer and an operating system. These can include executable and/or interpretable software programs or libraries. The number of software modules used can vary from one implementation to another.

In some embodiments the database of the search module 2 is a shared storage system which comprises a memory and is implemented in technical computing hardware, such as a server or a plurality of networked servers. The database may be located in the immediate vicinity of the search module 2 or at a remote geographic location from the search module 2.

The database is configured to store a plurality of items of data and metadata associated with each item. The items are stored in the database with the metadata values or attributes so that the metadata can be matched with search terms.

In some embodiments, the items of data that are stored in the database are content items and the attributes are metadata that describe parameters of the content items. For instance, in some embodiments, the content items are audio/visual content that is stored in the database with metadata describing attributes of the audio/visual contents, such as but not limited to image size, data type, file size, playback length, etc. A typical audio/visual database might store in excess of 700,000,000 items of audio/visual data along with the associated metadata.

It is, however, to be appreciated that the search method and apparatus of embodiments of the invention is not limited to an audio/visual application. Table 1 below shows just some of the many applications of embodiments of the invention, along with examples of metadata that can be used for each application.

TABLE 1

| Application | Metadata |
| --- | --- |
| Genomes | Sample ID, Label, Individual or Animal, Family, Gender, BMI, Age, Location |
| Life Science Cryo-electron microscopy (Cryo-EM) | Acquisition Date, Acquisition Time, Cs, Indicated Magnification, Voltage, Title, Width, Height, Resolution, Bits Per Pixel |
| Content | Coverage, Description, Type, Relation, Source, Subject, Title |
| Intellectual Property | Contributor, Creator, Publisher, Rights |
| Instantiation | Format, Identifier, Language |

Figure 3:
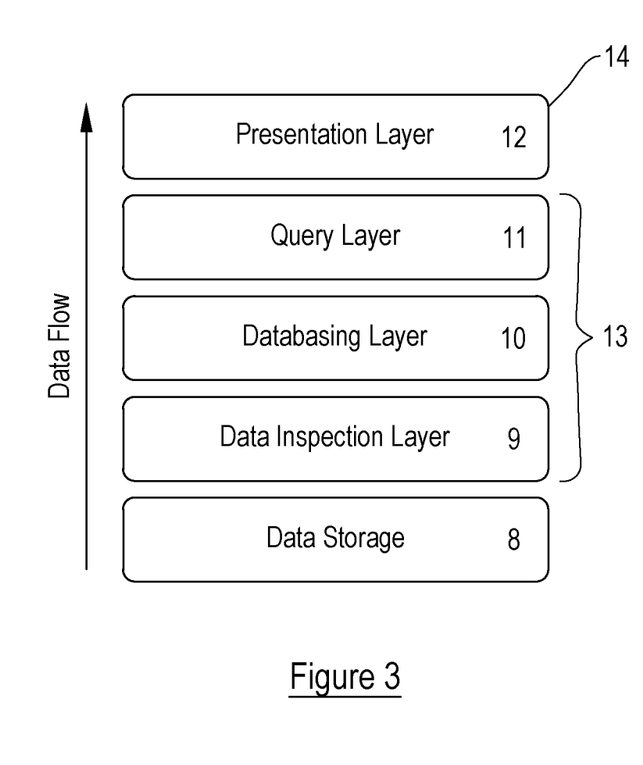
FIG. 3 is a schematic diagram showing the operating layers of a search apparatus of some embodiments.

Referring now to FIG. 3 of the accompanying drawings, the search apparatus 1 of some embodiments comprises a plurality of operative layers 8-12. The data storage layer 8 comprises the filesystem 3. In some embodiments, the data storage layer 8 also comprises the filesystem of each server 4, 5a-n which is used to access the filesystem 3.

The search apparatus 1 of some embodiments comprises backend or middleware layer 13 which comprises a data inspection layer 9, a databasing layer 10 and a query layer 11. The functionality of these backend layers 13 will be described in more detail below.

In some embodiments, the search apparatus 1 further comprises a presentation layer 12. It is, however, to be appreciated that the presentation layer 12 may be omitted in some embodiments.

In some embodiments, the presentation layer 12 is implemented in a user interface module 14 which is coupled to the search module 2. The user interface module 14 is implemented in technical computing hardware and is configured to receive data input by a user and to provide a data output to the user. In some embodiments, the user interface module 14 is configured to provide a graphical user interface to a user via a web browser.

In some embodiments, the user interface module 14 is implemented in a further hardware computing device, such as a desktop computer or a portable computing device, such as a laptop, a smartphone, a tablet computer or any other computing device that is configured to provide a user interface.

Figure 4:
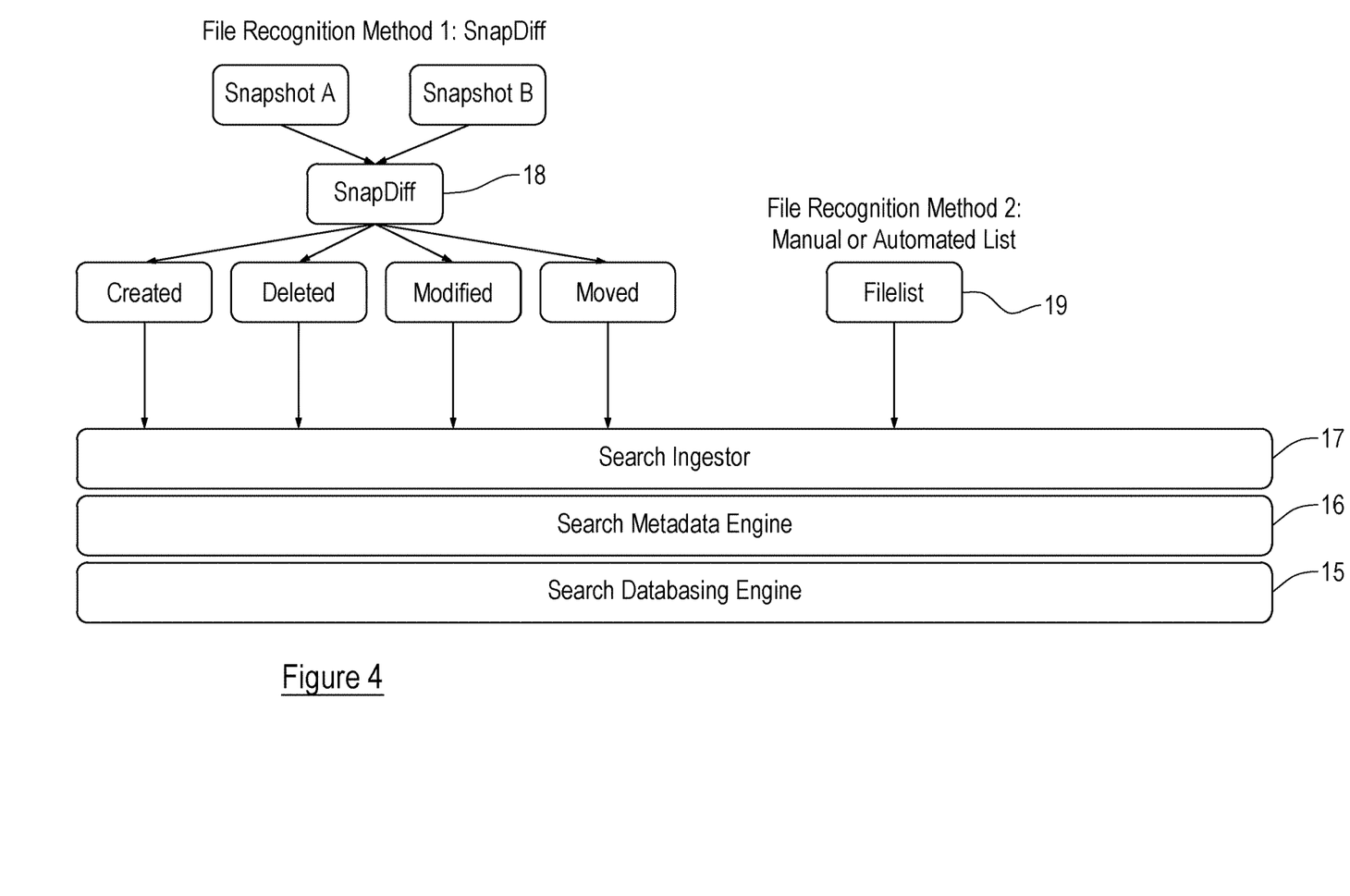
FIG. 4 is a schematic diagram showing the data ingestion process of a search apparatus of some embodiments.

Referring now to FIG. 4 of the accompanying drawings, the search apparatus 1 of some embodiments comprises functionality within the backend layers 13 to ingest data from the filesystem 3 and to respond to search queries. In these embodiments, the backend layers 13 comprise a search databasing engine 15, a search metadata engine 16 and a search ingestor module 17.

In some embodiments, the search apparatus 1 is configured to operate using a file recognition method which uses a SnapDiff module 18 which is configured to identify file differences between two snapshots A and B. The SnapDiff module 18 is configured to provide a list of newly created, deleted, modified or moved files to the search ingestor module 17.

In some embodiments, the search apparatus 1 is configured to provide a further file recognition method instead of, or in addition to the first recognition method described above. In the further recognition method, the search apparatus 1 is configured to pass defined lists of files 19, objects or other data parameters to the search ingestor 17.

It is to be appreciated that the functionality illustrated in FIG. 4 is an example of how the search apparatus 1 of some embodiments ingests data into the search module 2 for use when searching the filesystem 3. Other embodiments comprise other functionality within the backend layers 13 to optimise the search apparatus 1.

Figure 5:
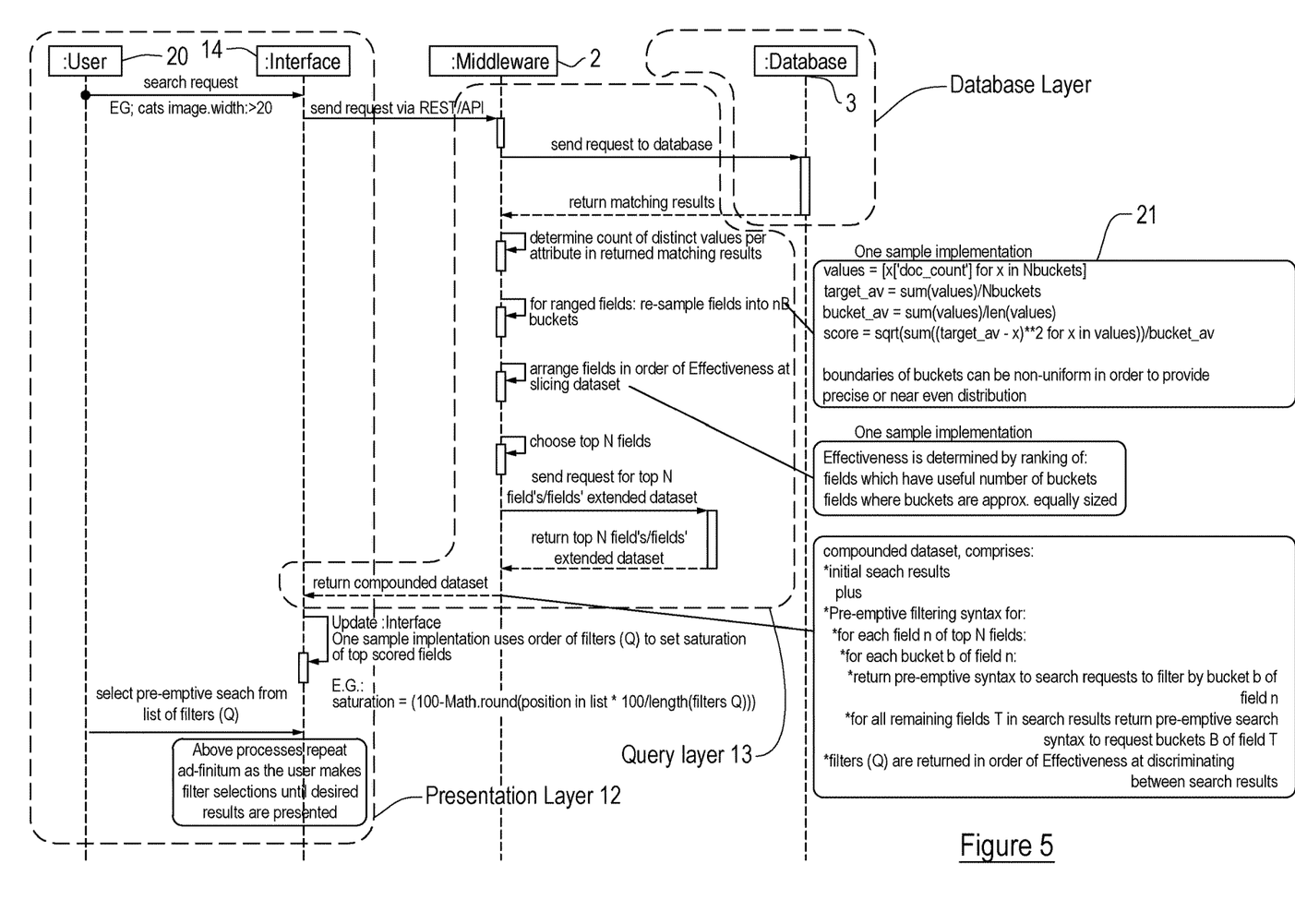
FIG. 5 is a sequence diagram showing the sequence of operation of an apparatus of some embodiments.

Referring now to FIG. 5 of the accompanying drawings, a method of searching the database using apparatus of some embodiments will now be described by way of an example search. The sequence diagram shown in FIG. 5 illustrates the sequence of events in the example search. FIG. 5 is labelled to indicate that the operations are performed respectively by the presentation layer 12, the backend or query layers 13 and the data storage layer 8. The sequence is initiated by a user 20 inputting a search request to the user interface module 14.

In this example, the search request is for a specific search term "cats". This search matches all items containing the word "cats" in the data stored in the database. When the user 20 inputs the search request to the user interface module 14, the user interface module 14 sends the search request to the search module 2. In some embodiments, the search request is sent to the search module 2 via a Representational State Transfer (REST) API.

The search module 2 sends the search request to the database to search the database for items containing the search term, wherein items containing the search term are matched items. Once the database has been searched, the database returns matching results for the matched items to the search module 2.

In this example, the search request only comprises one search term ("cats") but it is to be appreciated that the apparatus is configured to receive and carry out a search request comprising a search terms and at least one optional filter. For instance, in one example search, the search request takes the form "cats image.width: >20" which restricts the matched items to items which comprise the attribute "image.width" having a value which is greater than 20. It is to be appreciated that the method and apparatus are configured to carry out search requests comprising only a specific search term without any optional filters or a specific search term with any number of optional filters.

In other embodiments, the user interface module 14 sends the search request to the search module 2 by another means, such as a Python language based API call.

Those skilled in the art will be familiar with techniques for searching the database efficiently, for instance using an aggregate search technique. As will become clear from the description below, the method and apparatus of some embodiments further improves the search facility by initially optimising the search request input that is used to search the database.

Once the search module 2 receives the search results from the database, the search module 2 processes the search results by identifying fields corresponding to attributes of the matched items. For instance, the search module 2 could identify a field corresponding to an attribute "image.height" which is representative of a matched item having an attribute "image.height".

The search module 2 defines a range of values for each field. In effect each ranged field is an attribute of a data object. The search module 2 divides the range of values for each field into a plurality of ranged field buckets.

In this embodiment, the plurality of ranged field buckets are respective memory spaces in a memory within the search module 2.

The search module 2 is configured to re-sample the fields and to distribute the matched items between the ranged field buckets based on attributes of the matched items that are within the range of values for each ranged field bucket. For example, in some embodiments, the search module 2 assumes the minimum and maximum values range from 0 to 100 in an integer range with an optionally definable setting of N=5 buckets. The ranged field buckets are then defined for the following ranges:

Bucket 1=0-19
Bucket 2=20-39
Bucket 3=40-59
Bucket 4=60-79
Bucket 5=80-100

In some embodiments, the boundaries for each ranged field bucket can be non-uniform to provide a precise or near even distribution. This makes the ranges easier to be interpreted by a user.

One example implementation of a configuration of the search module 2 for re-sampling the fields into the ranged field buckets is illustrated in box 21 of FIG. 2. It is, however, to be appreciated that other embodiments use a different technique for re-sampling and distributing the matched items between the ranged field buckets.

The search module 2 is configured to calculate an effectiveness value for each field based on the number of matched items in each of the ranged field buckets, once the matched items have been distributed between the ranged field buckets, as described above. In this embodiment, the effectiveness value corresponds to the number of matched items in each of the ranged field buckets, such that the ranged field buckets having a greater number of matched items are deemed to have a higher effectiveness value than another ranged field bucket that has a lower number of matched items.

The search module 2 of this embodiment is configured to organise the fields in order of their effectiveness values to produce a list with the most effective fields appearing at the top of the list and the least effective fields appearing at the bottom of the list. However, in other embodiments, the search module 2 does not organise the fields into a list by effectiveness value.

In some embodiments, the search module 2 selects one or more top fields having an effectiveness value that is greater than a predetermined effectiveness value. In embodiments where the search module 2 organise the fields in order of their effectiveness value, the search module 2 may be configured to select the top N fields, where N is a predetermined number.

Once the search module 2 has selected the one or more top fields, the search module 2 provides an effectiveness indicator output to the user interface module 14 which is indicative of the effectiveness of each top field such that a user can use the effectiveness indicator output to select a top field for use as a filter in a further search. In some embodiments, the effectiveness indicator output is indicative of the effectiveness order of the fields identified by the search module 2.

In some embodiments, the search module 2 provides the effectiveness indicator output by outputting a graphical representation via the user interface module 14 for each of the top fields, where the graphical representation is indicative of the effectiveness value of the field. In some embodiments, the graphical representation is a coloured area of a display output which is provided by the user interface module 14, with the colour of each coloured area being selected in response to the effectiveness value of the field.

In further embodiments, the search module 2 is configured to select the colour of each coloured area by modifying the saturation level of the colour of each coloured area in response to the effectiveness value of the field. The colour selection and modification may be carried out using any means for rendering a graphical user interface. For instance, in one embodiment where the search module 2 organises the filters in order of their effectiveness value, the saturation of a graphical representation output via the user interface module 14 is calculated using an algorithm in HTML5 and CSS:

$$\text{saturation}=(100-\text{Math.round}(\text{position in list}*100/\text{length}(\text{filters Q})))$$

In other embodiments, the search module 2 is configured to provide an effectiveness indicator output by modifying a different attribute of an element output by the user interface module 14 such as, but not limited to; size, position, styling, opacity, depth, proximity, sound, etc.

Figure 6:
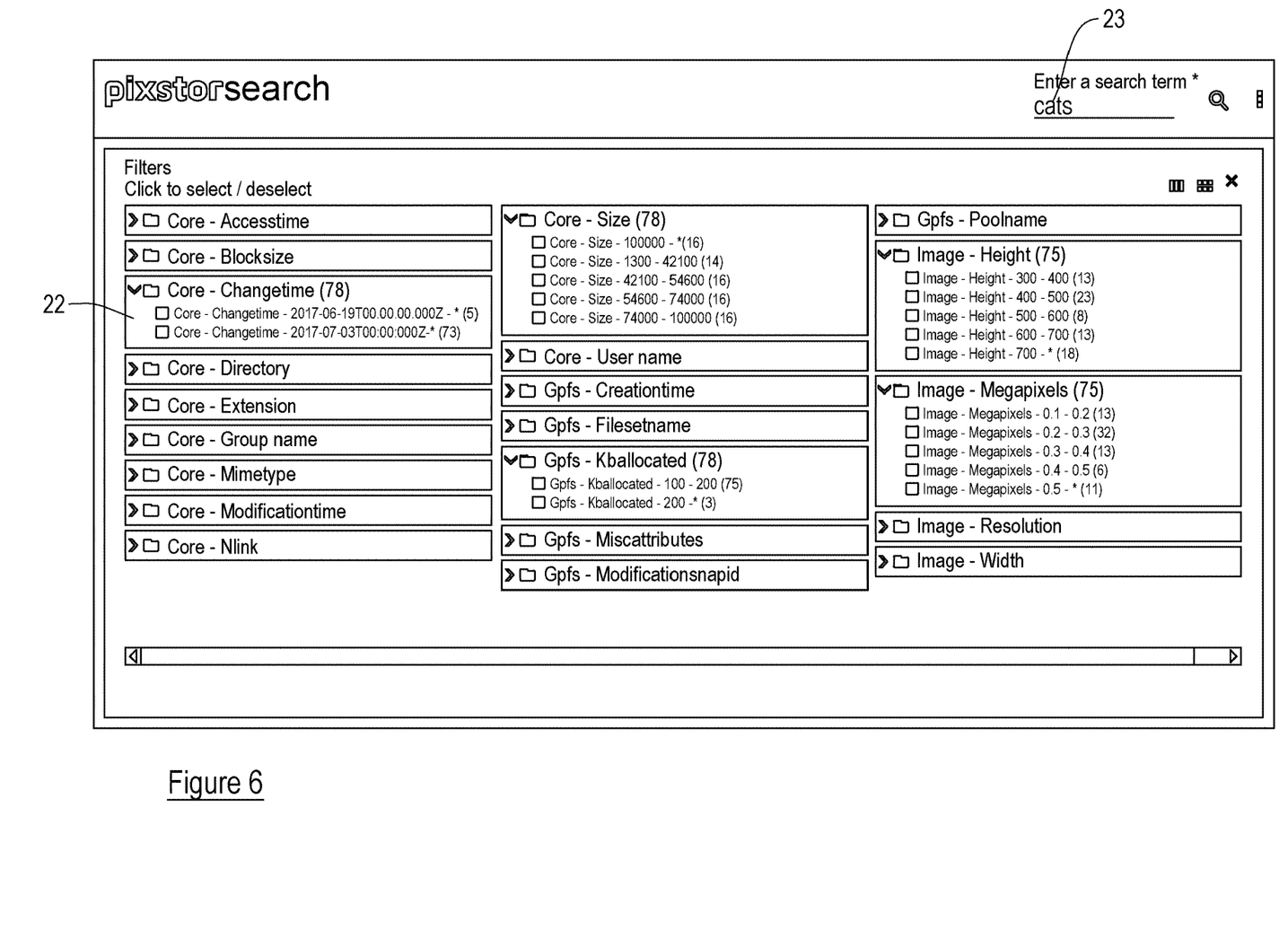
FIG. 6 is a diagrammatic view of part of a graphical user interface of some embodiments.

Referring now to FIG. 6 of the accompanying drawings, the user interface module 14 of some embodiments provides a user interface output that displays a plurality of graphical representations in the form of coloured areas 22. In this example, each coloured area 22 corresponds to a field and the saturation of the colour of each coloured area 22 is selected depending on the effectiveness value of each field.

In this example, the fields that have higher effectiveness values are shown in a lighter colour than the fields that have lower effectiveness values.

A user enters a search term into a search box 23; which in this example is for items containing the word "cats". The method searches the database for matched items containing the word "cats", as discussed above. The user interface module then provides an effectiveness indicator output to a user for the top fields of the matched items by varying the saturation of the colour of the coloured areas 22 according to the effectiveness values.

The user interface module 14 is configured to receive an input from a user which selects one or more the fields represented by the coloured areas 22. In this example, the user interface module 14 receives the input by a user selecting or clicking on one of the coloured areas 22. The search module 2 is configured to receive the input and to generate a further search instruction which comprises the search term and a filter corresponding to the field selected by the user input. The search module 2 uses the further search instruction to perform a further search of the database for items containing the search term and a field corresponding to the filter.

A user can therefore select one or more of the top fields using the user interface module to refine further searches of the database. The user interface module 14 makes it easier for a user to select relevant fields for use as filters in a further search by highlighting the most relevant fields.

The search module 2 of some embodiments is configured to generate a further search instruction automatically based on one or more of the top fields identified as described above. In some embodiments, the user interface module 14 is configured to output the further search instruction to a user. In these embodiments, the user interface module 14 is configured to receive a further input from a user which selects the further search instruction and which triggers the search module 2 to perform a further search based on the further search instruction.

The search method and apparatus of some embodiments enables a user to search a database more quickly and efficiently than a conventional database search method and apparatus. The method and apparatus provides an improved search facility by providing an output that guides a user to select relevant fields for use in a search. This helps to minimise the risk of the search facility generating irrelevant search results from an overly generalised search request. The search method and apparatus of some embodiments therefore provides a technical advancement over conventional database search technology.

While the embodiments described above provide an output to a user via the user interface module 14, in other embodiments the search apparatus 1 provides an output to a search direction module which is configured to use the effectiveness indicator output to direct or refine the search to optimise the search apparatus as described above. In some embodiments, the search direction module is an artificial intelligence or machine learning module which is configured to interpret outputs from the search module 2, such as the effectiveness indicator output, and to configure the search apparatus 1 in response to the output from the search module 2. In embodiments which comprise the search direction module, the search apparatus 1 is configured to operate according to an output of the search direction module in additional to or instead of a selection provided by a user via the user interface module 14.

The improved performance of the search apparatus 1 of some embodiments over a conventional GPFS file system will now be described with reference to FIGS. 7 and 8.

Figure 7:
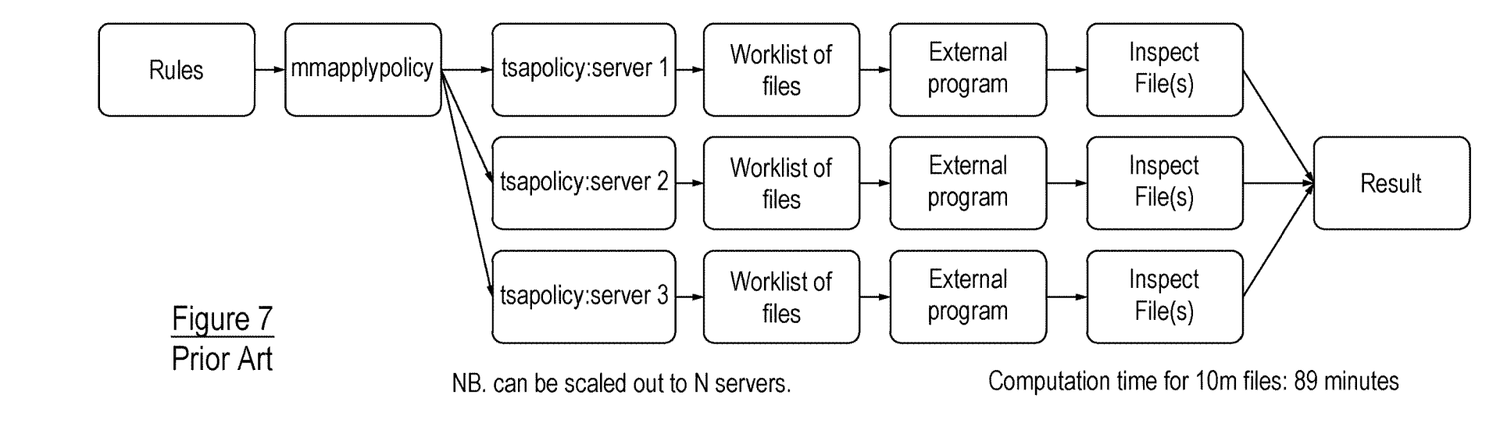
FIG. 7 is a flow diagram showing the processing operations performed by a conventional search apparatus.

FIG. 7 shows a typical method for inspecting all files in a conventional GPFS file system. The method is for determining files on a GPFS file system which contain textural references to the contents or abstract of another file on the same file system and the method operates as follows:

1. The ruleset identifies files to be matched based on a criteria.
2. The worklist of files is split between N nodes participating in the search (i.e. linear scale out).
3. The inode sub-lists are processed in parallel across all nodes.
4. Inodes which match the criteria are added to worklist files for each node N.
5. Each node N spawns an external program to read the candidate list from each worklist file.
6. Each external program then inspects the file(s) and returns the result individually. In a conventional system, the external program may be enacted once for each line in the worklist file. This is extremely inefficient in terms of resource overhead and processing time.
7. The results from each node N are collated.
8. The results are then likely to be required to be post-processed and inspected to determine any associations. In other words, the process would need to identify text within the files.
9. Finally, the result is provided.

In an experimental test, a conventional GPFS file system operating according to the method illustrated in FIG. 7 took 89 minutes to return a result when searching 10,000,000 files.

Figure 8:
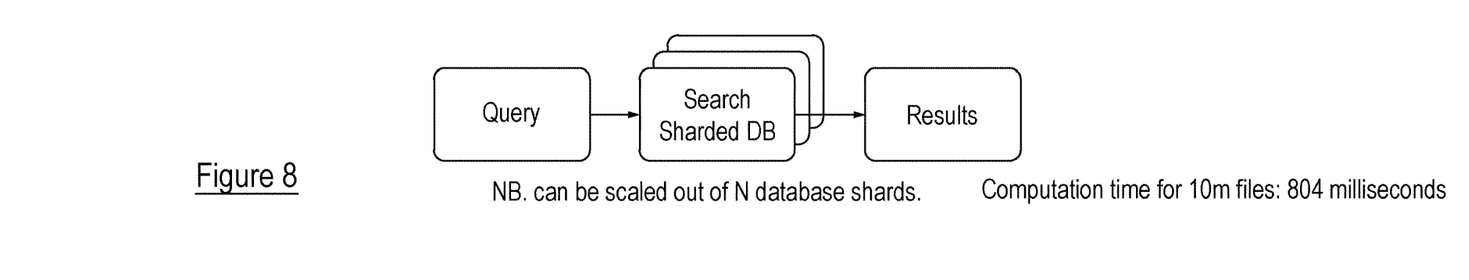
FIG. 8 is a flow diagram showing the search operations of a search apparatus of some embodiments.

By contrast, FIG. 8 shows a method of some embodiments which operates as follows:

1. A search query is sent to a database which is sharded N-ways for linear scale out.
2. The sharded database performs the query.
3. The result is returned in accordance with the search sequence shown in FIG. 5 of the accompanying drawings to provide an order of magnitude performance over a conventional system.

In contrast to the conventional method illustrated in FIG. 7, the search apparatus 1 of some embodiments took less 804 milliseconds to return a result when searching 10,000,000 files. The search apparatus 1 of some embodiments therefore provides orders of magnitude performance increases over a conventional search system, such as a GPFS file system, with respect to retrieving sets of data.

It is also to be appreciated that the search apparatus 1 of some embodiments is similarly capable of performing other correlations such as visual similarity, colour, size, shape or other correlations based on metadata.

Embodiments of the subject matter and the functional operations described herein can be implemented in digital electronic circuitry, or in computer software, firmware, or hardware, including the structures disclosed in this specification and their structural equivalents, or in combinations of one or more of them.

Some embodiments are implemented using one or more modules of computer program instructions encoded on a computer-readable medium for execution by, or to control the operation of, a data processing apparatus. The computer-readable medium can be a manufactured product, such as hard drive in a computer system or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

The processes and logic flows described in this specification can be performed by one or more programmable processors executing one or more computer programs to perform functions by operating on input data and generating output.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices.

Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks.

To provide for interaction with a user, some embodiments are implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A database management system comprising:
   a General Parallel File System (GPFS) server storing items of data in a GPFS file system;
   a database storing metadata associated with each item of data; and
   a search apparatus coupled to the database, the search apparatus comprising:
     a processor configured to execute instructions;
     a memory storing instructions which, when executed by the processor, cause the processor to:
       search the database for items containing a search term, wherein items containing the search term are matched items;
       identify fields corresponding to attributes of the matched items;
       define a range of values for each field;
       divide the range of values for each field into a plurality of ranged field buckets;
       distribute the matched items between the ranged field buckets based on attributes of the matched items that are within the range of values for each ranged field bucket;
       calculate an effectiveness value for each field based on the number of matched items in each of the ranged field buckets;
       select one or more top fields, each top field having an effectiveness value that is greater than a predetermined effectiveness value; and
       provide an effectiveness indicator output which is indicative of the effectiveness of each top field such that a user can use the effectiveness indicator output to select a top field for use as a filter in a further search.

2. The apparatus of claim 1, wherein the memory further stores instructions which, when executed by the processor, cause the processor to:
   generate a further search instruction comprising the search term and a filter, wherein the filter corresponds to one or more of the top fields.

3. The apparatus of claim 2, wherein the memory further stores instructions which, when executed by the processor, cause the processor to:

provide a further search instruction output to a user which is indicative of the further search instruction; and receive an input from the user which selects the further search instruction for use in a further search.

4. The apparatus of claim 1, wherein the memory further stores instructions which, when executed by the processor, cause the processor to:

determine an effectiveness order for each top field based on its effectiveness value, wherein the effectiveness indicator output is indicative of the effectiveness order.

5. The apparatus of claim 1, wherein the memory further stores instructions which, when executed by the processor, cause the processor to:

output a graphical representation for each of the top fields which is indicative of the effectiveness value of the field.

6. The apparatus of claim 5, wherein the memory further stores instructions which, when executed by the processor, cause the processor to:

select the colour of each coloured area in response to the effectiveness value of the field.

7. The apparatus of claim 6, wherein the memory further stores instructions which, when executed by the processor, cause the processor to:

select the colour of each coloured area by modifying the saturation level of the colour of each coloured area in response to the effectiveness value of the field.

8. The apparatus of claim 5, wherein the memory further stores instructions which, when executed by the processor, cause the processor to:

modify a transparency level of at least part of the graphical representation in response to the effectiveness value of the field.

9. The apparatus of claim 1, wherein the memory further stores instructions which, when executed by the processor, cause the processor to:

calculate a further effectiveness value corresponding to an extended attribute for a field based on the number of matched items in each ranged field bucket that comprise the extended attribute.

10. The apparatus of claim 1, wherein the apparatus comprises a plurality of shards which each comprise a memory which stores the same instructions as the memory of any one of the preceding claims.

11. A method of managing a database system, wherein the system comprises a General Parallel File System (GPFS) server storing items of data in a GPFS file system and a database storing metadata associated with each item of data, the method comprising:

searching the database for items containing a search term, wherein items containing the search term are matched items;

identifying fields corresponding to attributes of the matched items;

defining a range of values for each field;

dividing the range of values for each field into a plurality of ranged field buckets;

distributing the matched items between the ranged field buckets based on attributes of the matched items that are within the range of values for each ranged field bucket;

calculating an effectiveness value for each field based on the number of matched items in each of the ranged field buckets;

selecting one or more top fields, each top field having an effectiveness value that is greater than a predetermined effectiveness value; and providing an effectiveness indicator output which is indicative of the effectiveness of each top field such that a user can use the effectiveness indicator output to select a top field for use as a filter in a further search.

12. The method of claim 11, wherein the method further comprises:

generating a further search instruction comprising the search term and a filter, wherein the filter corresponds to one or more of the top fields.

13. The method of claim 12, wherein the method further comprises:

providing a further search instruction output to a user which is indicative of the further search instruction; and receiving an input from the user which selects the further search instruction for use in a further search.

14. The method of claim 11, wherein the method further comprises:

determining an effectiveness order for each top field based on its effectiveness value, wherein the effectiveness indicator output is indicative of the effectiveness order.

15. The method of claim 11, wherein providing the effectiveness indicator output comprises:

outputting a graphical representation for each of the top fields which is indicative of the effectiveness value of the field.

16. The method of claim 15, wherein the graphical representation is a coloured area and the method comprises:

selecting the colour of each coloured area in response to the effectiveness value of the field.

17. The method of claim 16, wherein the method comprises:

selecting the colour of each coloured area by modifying the saturation level of the colour of each coloured area in response to the effectiveness value of the field.

18. The method of claim 15, wherein the method comprises:

modifying a transparency level of at least part of the graphical representation in response to the effectiveness value of the field.

19. The method of claim 11, wherein the method further comprises:

calculating a further effectiveness value corresponding to an extended attribute for a field based on the number of matched items in each ranged field bucket that comprise the extended attribute.

20. A non-transitory computer readable medium storing instructions which, when executed by a processor of a search apparatus coupled to a General Parallel File System (GPFS) server storing items of data in a GPFS file system and a database storing metadata associated with each item of data, cause the search apparatus to:

search the database for items containing a search term, wherein items containing the search term are matched items;

identify fields corresponding to attributes of the matched items;

define a range of values for each field;

divide the range of values for each field into a plurality of ranged field buckets;

distribute the matched items between the ranged field buckets based on attributes of the matched items that are within the range of values for each ranged field bucket;

calculate an effectiveness value for each field based on the number of matched items in each of the ranged field buckets;

select one or more top fields, each top field having an effectiveness value that is greater than a predetermined effectiveness value; and provide an effectiveness indicator output which is indicative of the effectiveness of each top field such that a user can use the effectiveness indicator output to select a top field for use as a filter in a further search.

\* \* \* \* \*